April 14, 1964      J. P. LE BEL      3,128,964
SPACE VEHICLE WITH COOLED BALL ON LEADING END
Filed Sept. 17, 1962      3 Sheets-Sheet 1
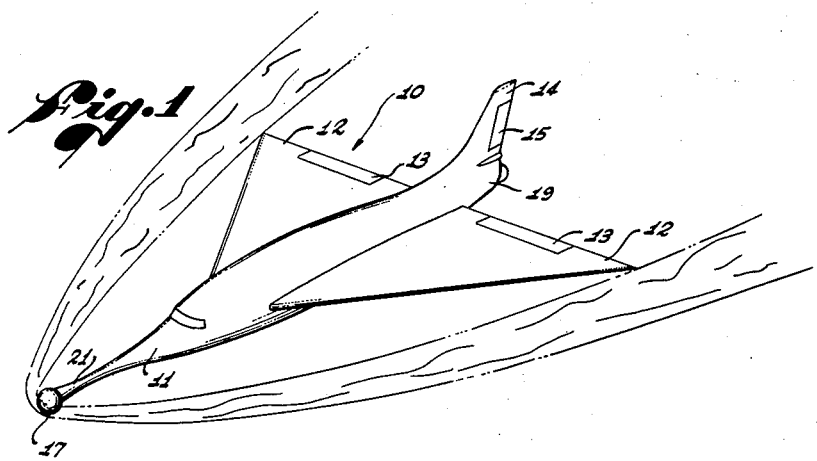
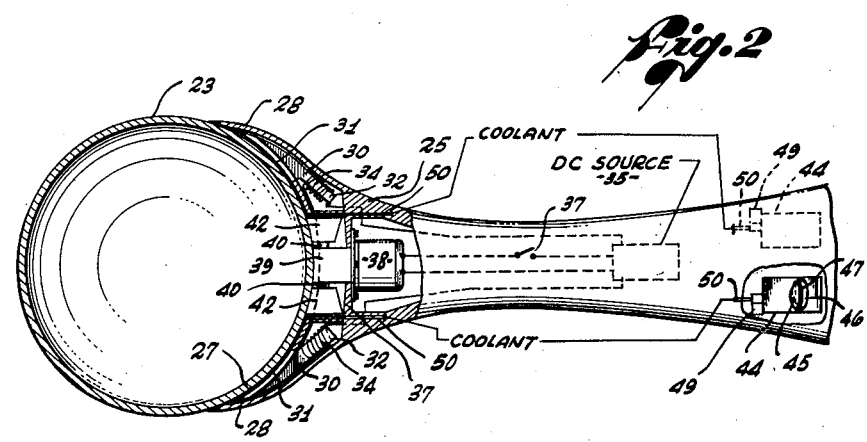
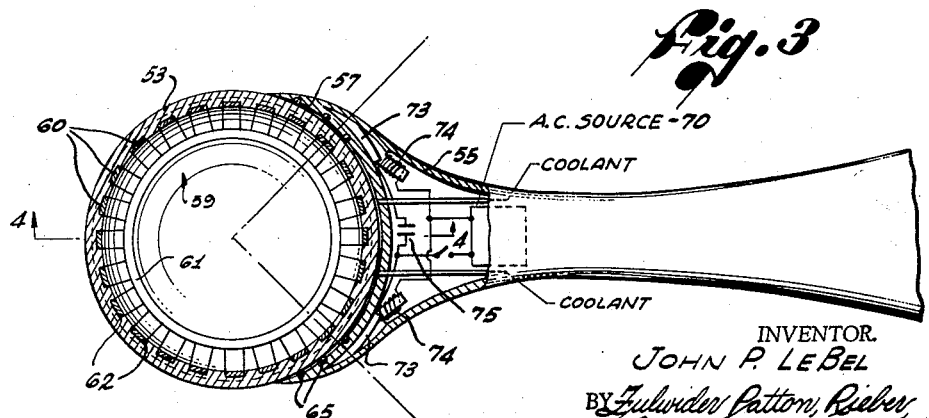
INVENTOR.
JOHN P. LE BEL
BY Fulwider, Patton, Rieber,
Lee and Utecht
ATTORNEYS April 14, 1964      J. P. LE BEL      3,128,964
SPACE VEHICLE WITH COOLED BALL ON LEADING END
Filed Sept. 17, 1962      3 Sheets-Sheet 2
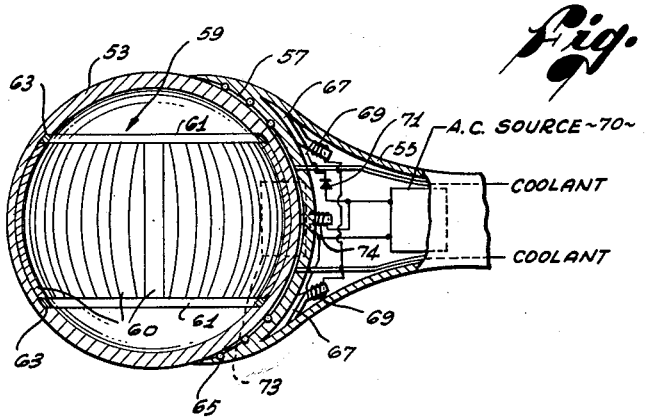
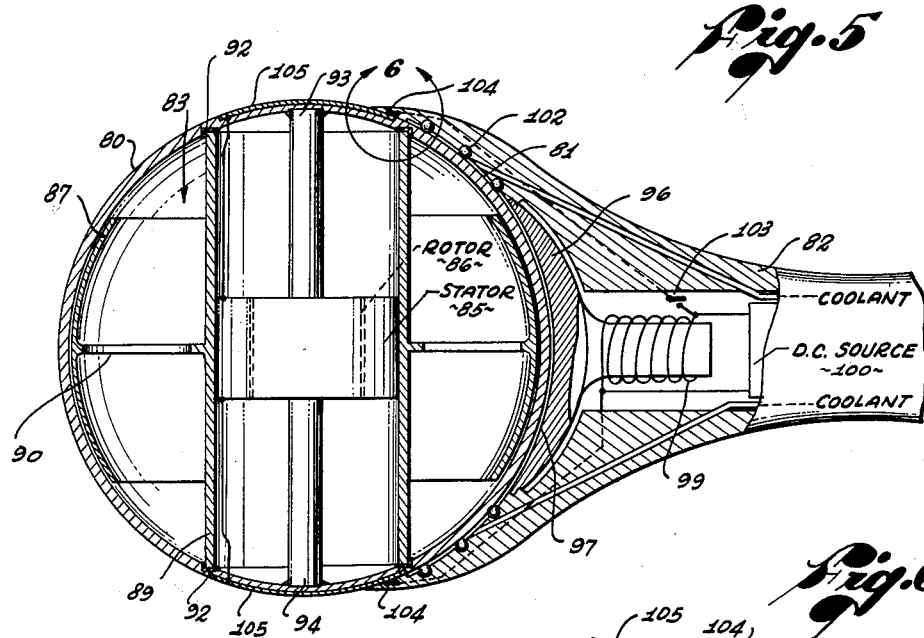
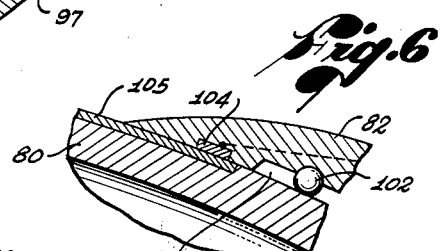
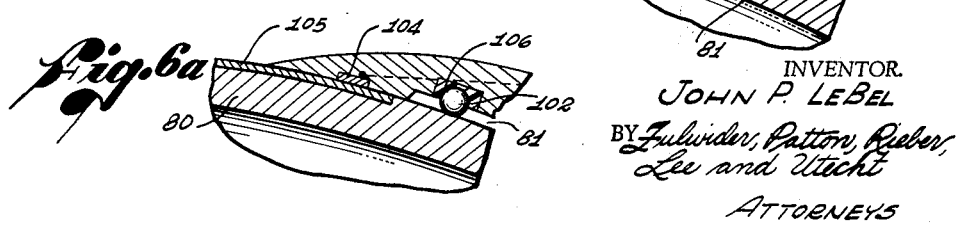
INVENTOR.
JOHN P. LeBEL
BY Fulwider, Patton, Rieber,
Lee and Utecht
ATTORNEYS April 14, 1964   J. P. LE BEL   3,128,964
SPACE VEHICLE WITH COOLED BALL ON LEADING END
Filed Sept. 17, 1962   3 Sheets-Sheet 3
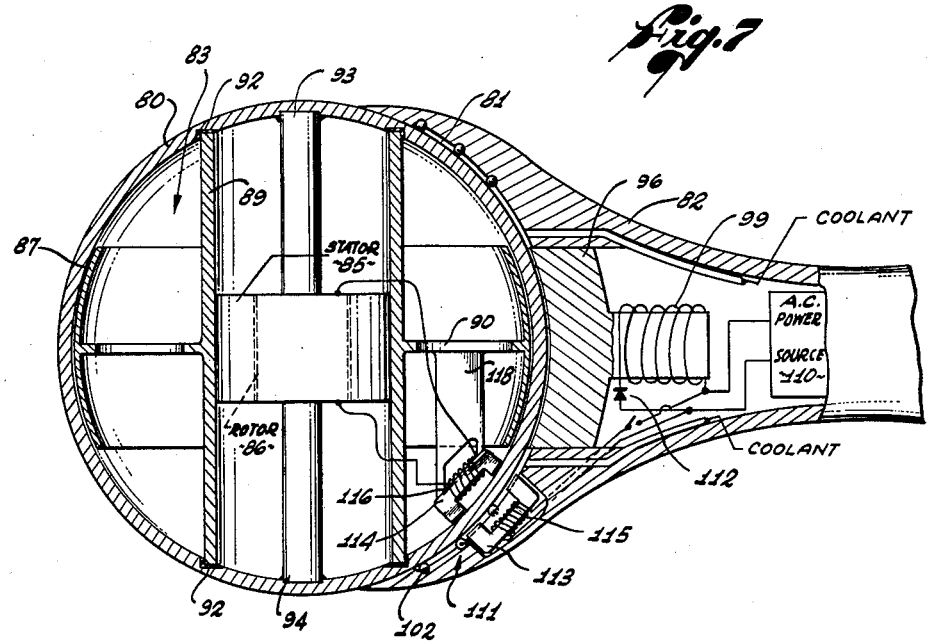
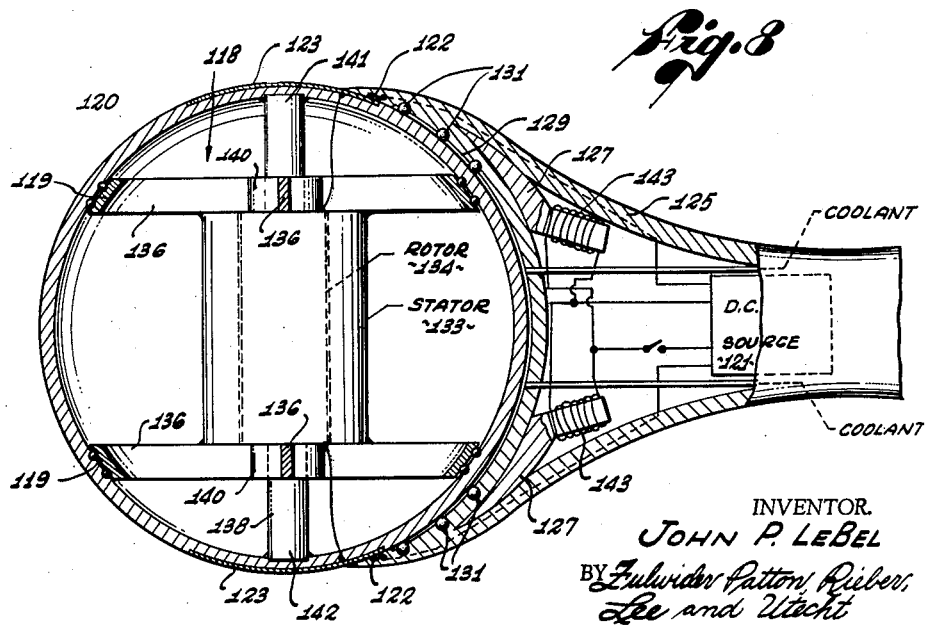
INVENTOR.
JOHN P. LeBEL
BY Fulwider Patton Rieber,
Lee and Utecht
ATTORNEYS

3,128,964
SPACE VEHICLE WITH COOLED BALL
ON LEADING END
John P. Le Bel, 1948 E. 5th Ave., Mesa, Ariz., assignor of one-half to Hugh E. Nichols, Higley, Ariz.
Filed Sept. 17, 1962, Ser. No. 224,039
19 Claims. (Cl. 244—1)

This invention relates generally to space vehicles, and more particularly to new and improved means for preventing generation of excessive heat in the airframes of space vehicles travelling through the atmosphere at supersonic and hypersonic velocities.

The term "space vehicle" is deemed to include both unmanned missiles and manned craft designed for flight at high velocities outside of and through the earth's atmosphere. Upon re-entering the earth's atmosphere, the airframes of such space vehicles encounter extremely high temperatures, often in excess of 5,000° F., due to the resistance offered by the ram effect of the air. This heat generation phenomenon is frequently referred to as the "heat barrier," since the high temperatures are capable of consuming a space vehicle, during re-entry, before it can be brought to earth.

To date, space vehicles have generally embodied massive nose cones or heat shields of ablative or heat sink material for hypersonic ballistic re-entry into the earth's atmosphere. Thus, for applications involving an intense, short duration, heating cycle, as in the case of ballistic re-entry, the provision of massive consumable nose cones and re-radiating heat shields have generally proven satisfactory in most instances.

However, attention has recently turned to more complex re-entry systems, involving positive control by a pilot or auto-pilot, and depending upon the use of aerodynamic control forces. With this type of re-entry system, the duration of the heating cycle increases substantially. Sustained hypersonic flight through earth's re-entry corridor introduces a different type of aerodynamic and thermodynamic problem than that involved in the much simpler ballistic re-entry situation. In particular, lifting re-entry may require a time period of the order of an hour or more, depending primarily on the lift to drag ratio. Ample time is available, therefore, for heat to penetrate into the interior of the nose cone and leading edges of the aerodynamic control surfaces, and for surface oxidation to occur. Hence, those concerned with the development of space vehicles have long sought for a reliable means, of relatively low mass, capable of shielding the airframe of a vehicle against re-entry heating for extended periods of time.

Accordingly, it is an object of the present invention to provide a new and improved space vehicle which overcomes the above and other disadvantages of the prior art.

Another object is to provide means for enabling vehicles to successfully penetrate the heat barrier for extended periods of time.

A further object of the invention is the provision of an improved fluid-cooled means at the forward end of a space vehicle for dissipating heat generated during sustained supersonic and hypersonic flight through the atmosphere.

Still another object is to provide an improved space vehicle embodying a bulbous, fluid-cooled nose which is magnetically supported within the vehicle airframe.

Yet another object of the present invention is the provision of a heat-dissipating nose ball configuration for a space vehicle, wherein the supporting structure for the nose ball is shielded from ram heating during high velocity flight through the atmosphere.

A still further object is to provide a nose ball configuration for a space vehicle, wherein the nose ball is evaporatively cooled and magnetically held within a supporting fairing.

Still another object of the invention is the provision of an improved nose ball configuration for a space vehicle, wherein the ball is magnetically held within a fairing and is electromagnetically rotated about an axis transverse to the longitudinal axis of the vehicle airframe, to bring forward heated areas of the nose ball inwardly for exposure to a fluid coolant.

A further object is to provide, in a space vehicle, means for utilizing the ram effect of the atmosphere for controlled deceleration of the vehicle during an extended re-entry interval, such means being capable of dissipating ram generated heat with less total mass and with lower temperature materials than with the heat sink and ablative shielding structures heretofore available.

The above and other obejcts and advantages of this invention will be better understood by reference to the following detailed description when considered in connection with the accompanying drawings of illustrative embodiments thereof, wherein:

FIGURE 1 is a perspective view of a space vehicle incorporating a nose ball configuration in accordance with the present invention;

FIGURE 2 is a partial plan view, portions in section, of a vehicle nose in accordance with one embodiment of the invention wherein the nose ball is magnetically held and mechanically rotated within its supporting fairing, one form of an appropriate coolant means for the nose ball being also illustrated;

FIGURE 3 is a partial elevational view, portions in section, of another form of the invention wherein the nose ball is both magnetically held and magnetically rotated within its supporting fairing;

FIGURE 4 is a sectional view, taken along the line 4—4 of FIGURE 3;

FIGURES 5, 7, and 8 are partial plan views, portions being shown in section, of additional forms of the invention wherein the nose ball is magnetically held within its supporting fairing and is rotated about an axis perpendicular to the longitudinal axis of the fairing by means of an electrical motor supported within the nose ball;

FIGURE 6 is an enlarged, fragmentary sectional view of the area 6 in FIGURE 5, and illustrates the ball bearing seat structure and means for coupling electrical power from the fairing to the motor within the nose ball; and FIGURE 6a is an enlarged, fragmentary sectional view similar to FIGURE 6, and illustrates another form of the bearing seat structure for the ball bearings extending from the fairing and abutting the surface of the nose ball seated therein.

Referring now to the drawings, and particularly to FIGURE 1 thereof, there is shown a manned space vehicle 10 incorporating the nose ball configuration of the present invention. The space vehicle 10 is adapted for flight both above and below altitudes of 60 miles and, accordingly, is provided with conventional airfoils and control surfaces for controlling the craft during subsonic, transonic, supersonic and hypersonic atmospheric flight. Hence, the fuselage 11 of the vehicle 10 carries a pair of horizontal wings 12, each of which is fitted in its trailing edge with an elevon 13, and a vertical stabilizer 14 fitted with a rudder 15 along its trailing edge. The leading edges of all of these airfoils may be coated with a protective layer of heat resistance or ablative material, or these airfoils may embody appropriate cooling means of the type set forth in my co-pending application Serial No. 4,388, filed January 25, 1960, for Space Vehicle. In addition, the forward surface or nose of the fuselage 11 is provided with a fluid-cooled nose ball 17 which probes the atmosphere ahead of the vehicle and bears the brunt of the ram effect heating.

The size of the nose ball 17 is selected in accordance with the amount of drag or braking desired when the nose ball is used to harness the ram effect during atmospheric re-entry of the vehicle 10. Moreover, the greater the diameter of the probing nose ball 17, the greater the surface area provided over which heat generated during re-entry may be distributed. In addition, the size of the nose ball 17 may be selected to vary the amount of shielding afforded remaining structural areas of the vehicle 10, and also to control the degree with which the shock wave pattern is opened by the nose to control parameters affecting optimum design of the fuselage and control surfaces aft of the nose.

The space vehicle 10 may have a rocket motor 19 and thus comprise the last stage of a multi-stage vehicle. Alternatively, the vehicle 10 may be adapted for gliding or free-fall return into the atmosphere, and may have an air-breathing engine for use at lower altitudes where the air is less rarified.

When the space vehicle 10 enters the atmosphere at typical supersonic or hypersonic velocities, the ram effect causes extreme generation of heat on the nose of the fuselage 11. The vehicle 10 is concurrently decelerated by the drag upon the nose ball 17 and other craft surfaces, and eventually will slow down to a velocity at which the ram effect does not cause generation of temperatures above the failure temperatures of the vehicle structural materials. However, in a manned vehicle, the deceleration must be retarded at a rate which can be withstood by the occupant of the vehicle. The pilot must thus control the glide angle by maneuvering the vehicle 10 with suitable reaction jet controls and by conventional airfoil controls. At the same time, the leading surfaces, and primarily the nose of the fuselage 11, must be maintained at a temperature which is safe for the materials used. The cooling means need not be constantly in operation, but, on the other hand, must have a capacity sufficient to dissipate excessive heat during the period of deceleration. This cooling becomes even more critical during manned flights, because of the extended duration of the heat cycle and the upper temperature limit which the pilot can be expected to physically withstand inside the vehicle.

The present invention is primarily concerned with the dissipation of heat generated at the nose of the fuselage 11 during the re-entry heat cycle. For cooling the nose, the nose ball 17 is held within a supporting fairing 21 in a manner enabling rotation of the nose ball for successive exposure of its heated surface to cooling system within the fairing. In accordance with the invention, the fairing 21 supports the nose ball 17 behind the diametral plane of the ball, so that the nose presents a smooth, unbroken spherical surface to the incoming shock wave. This arrangement of supporting the nose ball behind its diametral plane prevents the generation of hot spots which might otherwise occur if the fairing support structure at the side of the nose ball were exposed.

Referring now particularly to FIGURE 2, there is shown one embodiment of the nose ball configuration of the present invention, wherein a nose ball 23 is magnetically held within a supporting fairing 25 and is evaporatively cooled while being magnetically rotated about an axis perpendicular to the longitudinal axis of the vehicle airframe. The ball 23 is a generally hollow sphere of any suitable high temperature, magnetic material, such as Inconel, Nicalloy, or the like. A number of suitable materials for the ball are set forth in pages 263–266 of the McGraw-Hill Encyclopedia of Science and Technology, McGraw-Hill Book Company, Inc., 1960. Since the heated surfaces of the nose ball are evaporatively cooled, the ball may be fabricated of materials having much lower destruction temperatures than would otherwise be required if the surfaces were to be continuously heated without any cooling means being provided. Moreover, the mass of material required for the ball 23 is considerably less than that which would be necessary for a ball having a continuously heated surface.

The nose ball 23 seats within a concave, substantially hemispherical, cavity 27 at the aft end of the fairing 25. The ball 23 may have a running fit in the cavity 27 or, alternatively, may be slightly smaller than the cavity. The outer walls 28 of the supporting fairing 25 have a maximum outer diameter which is less than the outer diameter of the ball 23. Therefore, the nose ball 23 is supported behind its diametral plane, and no portion of the fairing structure supporting the ball projects beyond the ball cross-section presented by the nose during ram heating.

A pair of electromagnets 30 are housed within the fairing 25, at opposite sides thereof, and have their leading surfaces 31 seated flush within the cavity 27 adjacent the surface of the ball 23. The electromagnets 30 are fabricated of a suitable low reluctance magnetic material, so that they can be shaped as shown and still provide relatively uniform magnetic flux distribution over a wide area between the ball 23 and the face surfaces 31. Each of the electromagnets 30 also includes a leg 32 carrying an energizing winding 34. These energizing windings 34 are connected in series to any appropriate D.-C. source of electrical power 35 located at some convenient position within the vehicle.

Aft of the cavity 27, the fairing 25 carries an internal flange 37 which mounts a motor 38. The motor 38 has a forwardly extending output shaft (not shown) housed within a gearbox 39 disposed in a pocket behind the cavity 27. The gearbox 39 has a transversely extending output shaft 40 projecting from its opposite sides. The drive shaft 40 mounts and drives at its opposite ends a pair of friction rollers 42. These rollers 42, in turn, drivingly engage the spherical surface of the nose ball 23. The electrical source 35 is used to supply power to the motor 38, as well as to the energizing coils 34 of the electromagnets 30. A switch 37 is included in series with the motor 38, so that the motor may be selectively energized. Hence, the arrangement of FIGURE 2 enables the nose ball 23 to be magnetically held within the fairing cavity 27 by the electromagnets 30, and the ball is rotated by the frictional rollers 42 upon selective energization of the motor 38.

Also mounted at some convenient location within the fairing 25 are a pair of pressure pots 44, each comprising a water chamber 45 and a compressed air chamber 46. The chambers 45 and 46 are separated from one another by a flexible diaphragm 47. The water chambers of the pressure pots 44 have outlets which are normally closed by solenoid-operated valves 49. These valves 49, in turn, have outlets communicating with passages 50 extending longitudinally through the fairing 25 to the fairing cavity 27.

The motor 38 is of the reversible type and is controllable by the pilot both as to speed and direction of rotation. Moreover, the valves 49 adjacent the pressure pots 44 are also selectively controllable by the pilot so as to be opened and closed at will.

Appropriate instrumentation is included in the cockpit of the space vehicle 10 for apprising the pilot of the temperature level at the nose of the vehicle. When this temperature level reaches a predetermined value, the pilot, or an appropriate control system, actuates the motor 38 to rotate the nose ball 23. Simultaneously, the pressure pot valves 49 are opened. As a result, the pressure of the air in the chamber 46 of the pressure pots 44 drives water through the valves 49 and the passages 50, whereby the water (or other appropriate fluid coolant) is fed into the fairing cavity 27. Accordingly, as the nose ball 23 is rotated, its forward heated surface is moved rearwardly into contact with the fluid coolant in the cavity 27. The fluid coolant absorbs heat from the surface of the rotating nose ball 23 and is thereby caused to evaporate.

Referring now to FIGURES 3 and 4, there is shown an embodiment of the invention wherein a nose ball 53 is seated within a cavity 57 of a fairing 55 which supports the nose ball behind its diametral plane. In the embodiment of the invention shown in FIGURES 3 and 4, the method and means for directing coolant to the cavity 57 is the same as that previously described for the arrangement of FIGURE 2, but the nose ball 53 is magnetically, rather than mechanically, rotated.

The nose ball 53 is again fabricated of a suitable high temperature, magnetic material. Mounted within the ball 53, symmetrically disposed about a diametral plane including the longitudinal axis of the fairing 55, is a squirrel cage rotor 59 comprising rotor bars 60 and end rings 61 of a suitable electrically conductive material, such as copper, silver or the like. The rotor bars 60 and end rings 61 are embedded within appropriate slots 62 and 63, respectively, in the inner wall surface of the nose ball.

The nose ball 53 abuts a plurality of ball bearings 65 supported within the fairing 55 and projecting into the cavity 57. The nose ball is held against the bearings 65 in the cavity 57 by a pair of electromagnets 67 (see FIGURE 4) supported within the fairing behind the cavity 57. The magnetic cooperation between the electromagnets 67 and the nose ball 53 is the same as that for the nose ball 23 and electromagnets 30 in FIGURE 2. However, the energizing coils 69 of the electromagnets 67 are connected to an A.-C. source of electrical power 70, rather than a D.-C. source, and a rectifier 71 is included in series with the source to provide the necessary D.-C. magnetizing current.

The nose ball 53 is rotated by the magnetic field interaction between the squirrel cage rotor 59 within the ball and a pair of deflection poles 73 (see FIGURE 3) supported within the fairing 55 just aft of the cavity 57. These deflection poles 73 are positioned with their radial axes (from the center of the nose ball 53) displaced 90 electrical degrees in space. Each of the poles 73 includes an energizing winding 74, these windings being connected in parallel to the A.-C. source 70. A capacitor 75 is connected in series with one of the energizing windings 74, so that the energizing currents to the deflection poles 73 are 90° out of phase from each other. The effect of this wiring arrangement is the same as that of a two-phase system, and a rotating magnetic field is generated by the poles 73 to induce a corresponding rotating field in the squirrel cage rotor 59 within the probing nose ball 53. This method of generating self-starting and running torque in a squirrel cage rotor is fully described in pages 445–448 of "Electric Machinery," by A. E. Fitzgerald and Charles Kingsley, McGraw-Hill Book Company, Inc., 1952.

Referring now to FIGURE 5, a nose ball 80 is held within the cavity 81 of a supporting fairing 82 and is rotated by an electric motor 83 positioned inside the nose ball. In this embodiment of the invention, the nose ball 80 is made of a high temperature, non-magnetic material, such as pyrrolytic graphite or an appropriate ceramic material.

The motor 83 within the ball 80 includes a motor stator 85 and a rotor 86. The motor stator 85 is held stationary with respect to the fairing 82 while the rotor 86 and surrounding nose ball 80 rotate about the stator. This is accomplished as follows:

Positioned within the nose ball 80, symmetrically disposed about the diametral plane thereof, is a low reluctance magnetic ring 87 which is closely adjacent to, but does not contact, the inner surface of the ball. The magnetic ring 87 is provided with as great a surface area as possible for good magnetic attraction properties, and is made as thin as possible consistent with adequate structural rigidity, to minimize the mass of material required for the ring. A cylindrical sleeve 89, preferably of a light metal such as magnesium, aluminum, or the like, is coaxially aligned with the ring 87 and secured thereto by means of a structural web 90 extending between the sleeve and the ring. The motor stator 85 is carried within the sleeve 89 and is fixedly secured thereto. Opposite ends of the sleeve 89 are journalled within grooves 92 in the inner surface of the nose ball 83. These grooves 92 are lined with Teflon, or any other high temperature lubricating material, so that the sleeve 89, ring 87, and motor stator 85 are free for relative rotation with respect to the nose ball.

On the other hand, the rotor 86 of the electric motor 83 has its opposite ends 93, 94 fixed to the inner surface of the ball 80, so that operation of the electric motor will cause both the rotor and ball to rotate as an integral unit with respect to the stator 85 and magnetic ring 87. To this end, the ring 87 is magnetically held in a fixed position relative to the fairing 82 by a large electromagnet 96 centrally positioned within the fairing with its forward surface 97 flush within the cavity 81. The surface 97 of the electromagnet 96 is concentric with the surface of the magnetic ring 87. The energizing coil 99 of the electromagnet 96 is coupled directly to an appropriate D.-C. electrical source 100.

The electromagnet 96 not only aligns the magnetic ring 87, and prevents the motor stator 85 from rotating with the nose ball 80, but also provides a biasing magnetic force for holding the probing ball against the bearings 102 (see FIGURE 6) extending from the fairing 82 into the cavity 81.

As best observed in FIGURES 5 and 6, electrical power is supplied from the D.-C. source 100 through a series switch 103, to the interior of the nose ball 80 for operation of the motor 83. This is accomplished by a slip ring arrangement. In this arrangement, a pair of electrically conductive brushes 104, one at each side of the fairing 82, contact a pair of electrically conductive end caps 105 located at both sides of the ball 80. These end caps 105 extend over only a very narrow spherical zone above and below the diametral plane of the ball 80, and are inset within the outer surface of the ball to present a smooth, unbroken spherical configuration. Hence, the end caps 105 are positioned essentially tangent to the flow of air about the nose ball 80 and, therefore, are subject to less ram heating than portions of the ball surface which are more oblique to the flight path. The D.-C. source 100 is electrically connected across the brushes 104, and each of the conductive end caps 105 is, in turn, electrically connected to the motor stator 85 to supply electrical power to the motor.

FIGURE 6a illustrates an alternative embodiment of the bearing seat arrangement. In this embodiment, each bearing 102, instead of seating directly in the fairing structure 82, is journalled within a seat 106 of Teflon, or other solid state, high temperature, lubricating material. This arrangement inhibits the tendency for the bearings 102 to seize within their seats if they overheat. If desired, coolant channels can be directed to each of the seats 106 to permit an egress of coolant to the cavity 81 while simultaneously reducing the operating temperature of the bearings 102.

The embodiment of the invention shown in FIGURE 7 is essentially similar to that of FIGURE 5 with the exception that electrical power is coupled from the fairing 82 to the electric motor 83 by inductive coupling rather than by a slip ring arrangement. Hence, the D.-C. source 100, electrically conductive contact brushes 104, and end caps 105 are eliminated from the arrangement of FIGURE 7, and an A.-C. source of electrical power 110 and transformer 111 are substituted. Moreover, a rectifier 112 is included in series between the A.-C. source 110 and the energizing coil 99 of the electromagnet 96, so that the energizing coil receives only D.-C. magnetizing current. The A.-C. power is necessary, however, in view of the inductive coupling expedient employed to supply electrical energy to the motor 83.

The transformer 111 includes a pair of cores 113, 114, of low reluctance magnetic material. The core 113 carries an input winding 115 electrically connected across the A.-C. source 110, whereas the core 114 carries an output winding 116 electrically connected to the motor stator 85. The core 114 is supported at one end of an arm 118 extending from the structural web 90. Hence, the output half of the transformer 111 is maintained within the nose ball 80 in a stationary position with respect to the fairing 82. The input half of the transformer 111 is also held stationary relative to the fairing 82. Hence, once aligned, rotation of the ball 80 will not cause subsequent misalignment between the cores 113 and 114 of the transformer 111. To this end, the legs of the core 114 are spaced as closely as possible to the inner surface of the ball 80 without touching the latter surface. On the other hand, the legs of the core 113 project as far as possible into the fairing cavity 81 without actually contacting the outer surface of the nose ball 80. In this manner, the relatively high reluctance gap between the ends of adjacent legs of the cores 113 and 114 is kept to a minimum, to reduce transformer losses and increase the efficiency of power transmission between the A.-C. source 110 and the motor 83.

Although the arrangement of FIGURE 7 shows a transformer 111 for inductively coupling electrical power from the source 110 to the motor 83, this is by way of example only, and it is to be understood that other methods of inductively coupling the motor to the power source may be employed without in any way departing from the spirit and scope of the present invention.

Referring now particularly to FIGURE 8, a motor 118 is supported by a pair of circular gimbals 119 within a nose ball 120 of high temperature, non-magnetic material. The motor 118 is supplied with electrical power from a D.-C. source 121 by pairs of electrically conductive contact brushes 122 and conductive end caps 123, in the same manner as power is supplied from the source 100 to the motor 83 in FIGURE 5.

Both of the gimbals 119 are of low reluctance magnetic material and are ball bearing mounted adjacent the inner surface of the nose ball 120, so that the ball is free to rotate with respect to the gimbals. The gimbals 119 are, in turn, held in fixed spatial relationship with respect to the fairing 125. This is accomplished by a pair of electromagnets 127 supported within the fairing behind the fairing cavity 129, in positions to magnetically attract the gimbals. The also provides the necessary force for biasing the nose ball 120 into the fairing cavity 129 where it abuts the ball bearings 131.

The stator 133 of the motor 118 is held between the gimbals 119 in coaxial alignment therewith, and is fixedly secured in any well known fashion to a plurality of radial legs 136 extending from the gimbals to provide a supporting spider network. The rotor 134 of the motor 118 includes an output shaft 138, journalled within a pair of spider collars 140, the opposite ends 141, 142 of the output shaft being fixedly secured to the nose ball 120 at its internal surface.

Each of the electromagnets 127 includes an energizing coil 143, and these coils may be electrically connected in either series or parallel to the D.-C. source 121. Hence, as in the arrangements of FIGURES 5 and 7, the non-magnetic nose ball 120 is magnetically held to its supporting fairing 125, and is caused to rotate about an axis perpendicular to the longitudinal axis of the fairing by an electrical motor 118 within the ball, but receiving driving electrical power from a source within the fairing.

It will be apparent from the foregoing that, while particular forms of my invention have been illustrated and described, various modifications can be made without departing from the spirit and scope of my invention. Accordingly, I do not intend that my invention be limited, except as by the appended claims.

I claim:
1. A space vehicle, comprising:
    an airframe;
    a concave cavity at the leading end of said airframe;
    a body of revolution having a concentric surface seated within said cavity;
    means for magnetically holding said body within said cavity;
    means for rotating said body;
    and means to selectively cool the surface of said body within said cavity.
2. A space vehicle, comprising:
    an airframe;
    a concave recess at the leading end of said airframe, the surface of said recess defining a spherical zone;
    a body of revolution having a concentric surface seated within said recess;
    means for magnetically retaining said body within said recess;
    means for magnetically rotating said body about its axis;
    and means within said airframe for storing and delivering an evaporative coolant to the surface of said body within said recess as said body is rotated.
3. A space vehicle, comprising:
    an airframe;
    a cavity at the leading end of said airframe, the surface of said cavity defining a spherical zone of less than 180°;
    a body of revolution having its aft surface concentrically seated within said cavity;
    magnetic means for supporting said body within said cavity;
    means for rotating said body to bring its forward surface aft and within said cavity;
    and means to deliver coolant to said cavity as said body is rotated.
4. A space vehicle as set forth in claim 3, wherein said body of revolution is of high temperature, magnetic material; and said means for magnetically holding said body within said cavity includes at least one electromagnet within said airframe adjacent said cavity.
5. A space vehicle as set forth in claim 3, wherein said body is hollow and of non-magnetic, high temperature material; and said means for magnetically holding said body within said cavity includes a continuous magnetic surface adjacent the inner surface of said body and an electromagnet supported within said airframe in close proximity to said cavity.
6. A space vehicle as set forth in claim 3, wherein said means for rotating said body includes an electrical motor within said body and a source of electrical power for said motor within said airframe.
7. A space vehicle as set forth in claim 3, wherein said means for rotating said body includes a rotor of an electric motor supported within said body, and the stator of said motor supported within said airframe adjacent said cavity.
8. A space vehicle as set forth in claim 3, wherein said means for rotating said body includes a pair of friction rollers supported within said airframe adjacent said cavity, said rollers being in driving engagement with said body; and a motor in said airframe for driving said rollers.
9. A space vehicle, comprising:
    an airframe;
    a sphere of high temperature material;
    means to magnetically support said sphere behind the diametral plane of said sphere for rotation at the leading end of said airframe, said sphere having its forwardly facing surface exposed as the leading surface of said airframe and having its aft surface substantially enclosed within said airframe;
    drive means for rotating said sphere about an axis transverse to the longitudinal axis of said airframe;
a coolant reservoir mounted within said airframe;
and means for delivering coolant from said reservoir to the aft surface of said sphere as said sphere is rotated.

10. A space vehicle, comprising:
an airframe;
a substantially hollow sphere of high temperature, magnetic material mounted within a concave cavity at the forward end of said airframe, said sphere comprising the leading surface of said airframe;
electromagnetic means within said airframe for holding said sphere within said cavity;
a pair of friction rollers within said airframe adjacent said cavity and in driving engagement with said sphere;
a motor in said airframe for driving said rollers;
a coolant reservoir in said airframe;
conduit means for conducting a coolant from said reservoir to said cavity;
normally closed valve means to prevent the flow of coolant to said cavity through said conduit means;
means to force coolant from said reservoir when said valve means is opened;
and means to actuate said motor and open said valve means.

11. A space vehicle, comprising:
an airframe;
a spherical nose ball magnetically supported for rotatation at the leading end of said airframe;
means for rotating said ball to bring its forward surfaces aft;
and evaporative coolant means for removing heat from the aft surfaces of said ball as it rotates.

12. A space vehicle, comprising:
an airframe;
a magnetic ball supported behind its diametral plane at the leading end of said airframe;
means for rotating said ball to bring its froward surfaces aft within said airframe;
and means for cooling the aft surfaces of said ball.

13. A space vehicle, comprising:
an airframe;
a non-magnetic ball supported behind its diametral plane within a cavity at the leading end of said airframe;
means for rotating said ball to bring its forward surfaces aft within said cavity;
and means for delivering an evaporative coolant to the aft surfaces of said ball within said cavity.

14. A space vehicle, comprising:
an airframe;
a spherical ball supported behind its diametral plane at the leading end of said airframe;
means for selectively rotating said ball about an axis transverse to the longitudinal axis of said airframe;
and means for cooling the aft surfaces of said ball as it rotates.

15. A space vehicle, comprising:
an airframe;
a spherical ball supported behind its diametral plane and magnetically held at the leading end of said airframe;
a plurality of conductive rotor bars embedded within said ball and forming a rotor cage;
at least two stator poles supported within said airframe in positions for deflecting said rotor bars and thereby rotating said ball;
and means to cool the aft surfaces of said ball as said ball is rotated.

16. A space vehicle, comprising:
an airframe;
a spherical nose ball supported behind its diametral plane within a cavity at the leading end of said airframe;
a plurality of bearing seats within said airframe adjacent said cavity;
a plurality of bearings within said seats and in engagement with the aft surface of said ball;
electromagnetic means for rotating said ball about an axis perpendicular to the longitudinal axis of said airframe;
and means to deliver an evaporative coolant through said bearings seats to said cavity for cooling the aft surfaces of said ball as it rotates.

17. A space vehicle, comprising:
an airframe;
a spherical ball supported behind its diametral plane within a recess at the leading end of said airframe;
electromagnetic means within said airframe for maintaining said ball seated within said recess;
an electrical motor means within said ball for selectively rotating said ball about an axis perpendicular to the longitudinal axis of said airframe;
a source of electrical power within said airframe connected to said electromagnetic means;
means to couple said source to said motor;
and means to cool the aft surfaces of said ball as it rotates.

18. A space vehicle as set forth in claim 17, wherein said source of electrical power is coupled to said electrical motor by a conductive slip ring arrangement.

19. A space vehicle as set forth in claim 17, wherein said source of electrical power is inductively coupled to said motor.

References Cited in the file of this patent
UNITED STATES PATENTS

| | | |
|---|---|---|
| 3,062,148 | Le Bel | Nov. 6, 1962 |
| 3,080,816 | Levine | Mar. 12, 1963 |